US00RE39340E

(19) United States
(12) Reissued Patent
Adams et al.

(10) Patent Number: US RE39,340 E
(45) **Date of Reissued Patent: *Oct. 17, 2006**

(54) SPILL-REDUCTION CAP FOR FLUID CONTAINER

(75) Inventors: Brian M. Adams, Newark, CA (US); Hoa Pham, Mountain View, CA (US); Daniel Luch, Morgan Hill, CA (US)

(73) Assignee: Portola Packaging, Inc., Batavia, IL (US)

( * ) Notice: This patent is subject to a terminal disclaimer.

(21) Appl. No.: 09/375,164

(22) Filed: Aug. 16, 1999

Related U.S. Patent Documents

Reissue of:
(64) Patent No.: 5,687,865
Issued: Nov. 18, 1997
Appl. No.: 08/441,322
Filed: May 15, 1995

U.S. Applications:
(63) Continuation-in-part of application No. 08/436,936, filed on May 8, 1995, now Pat. No. 5,662,231, which is a continuation-in-part of application No. 08/016,577, filed on Feb. 10, 1993, now abandoned, which is a continuation-in-part of application No. 07/772,949, filed on Oct. 8, 1991, now Pat. No. 5,232,125.

(51) Int. Cl.
*B65D 41/34* (2006.01)

(52) U.S. Cl. ..... 215/253; 215/254; 215/256; 215/317; 215/321; 215/330; 215/331; 215/348; 215/352; 215/44; 141/18; 141/319; 141/354; 141/375

(58) Field of Classification Search ..... 215/43, 215/44, 247, 252, 253, 254, 256, 317, 318, 215/321, 330, 331, 348, 349, 350, 352; 220/229, 220/254, 270; 141/18, 319, 330, 346, 351, 141/354, 357, 363, 375; 222/83.5, 129, 146.6, 222/153.01, 484; 62/391
See application file for complete search history.

(56) References Cited

U.S. PATENT DOCUMENTS

| | | | | | |
|---|---|---|---|---|---|
| 1,142,210 | A | * | 6/1915 | Wagner | |
| 1,248,705 | A | * | 12/1917 | Pogue | |
| 2,213,465 | A | * | 9/1940 | Gay | 220/229 X |
| 3,392,860 | A | * | 7/1968 | Faulstich | 215/40 |
| 3,938,520 | A | * | 2/1976 | Scislowicz et al. | 128/272.3 |
| 3,979,002 | A | * | 9/1976 | Faulstich | 215/256 |
| 4,022,258 | A | * | 5/1977 | Steidley | 141/330 |
| 4,093,096 | A | * | 6/1978 | Augros | 215/330 |
| 4,173,858 | A | * | 11/1979 | Cassia | 141/18 X |
| 4,354,609 | A | * | 10/1982 | Hidding | 215/252 |
| 4,364,483 | A | * | 12/1982 | Golde | 215/218 |

(Continued)

FOREIGN PATENT DOCUMENTS

| | | | | |
|---|---|---|---|---|
| EP | 118267 | * | 10/1986 | 215/318 |
| IT | 448753 | * | 5/1949 | 215/254 |

*Primary Examiner*—Stephen K. Cronin
(74) *Attorney, Agent, or Firm*—Dorsey & Whitney LLP

(57) ABSTRACT

Two cap modifications are disclosed for use on water bottles to be installed in water dispensers. A central conical well in the top of the cap is formed with a scoreline. When the bottle is lowered into a dispenser, a probe of the dispenser enters the well and causes it to split along the scoreline. When the bottle is raised, the well substantially returns to initial condition, inhibiting spillage of any liquid remaining in the bottle.

28 Claims, 3 Drawing Sheets

U.S. PATENT DOCUMENTS 4,393,909 A * 7/1983 Pearson
4,460,100 A * 7/1984 Libit ..... 215/237
4,461,394 A * 7/1984 Sendel et al. ..... 215/330
4,527,704 A * 7/1985 Swartzbaugh ..... 215/252
4,527,706 A * 7/1985 Swartzbaugh et al. ..... 215/252
4,658,977 A * 4/1987 Crisci ..... 215/256
4,699,188 A * 10/1987 Baker ..... 141/18
4,736,859 A * 4/1988 Mayes et al. ..... 215/330
4,946,055 A * 8/1990 Towns et al. ..... 215/254
4,948,003 A * 8/1990 Munoz ..... 215/237
5,123,555 A * 6/1992 Luch ..... 215/251
5,188,628 A * 2/1993 Tani et al. ..... 604/405
5,202,093 A * 4/1993 Cloyd ..... 215/247 X
5,203,838 A * 4/1993 Schneider ..... 215/253
5,297,599 A * 3/1994 Bucheli ..... 141/329
5,395,365 A * 3/1995 Weiler et al. ..... 604/415
5,397,023 A * 3/1995 Toczek et al. ..... 220/709
5,513,763 A * 5/1996 Adams et al. ..... 215/254

* cited by examiner

SPILL-REDUCTION CAP FOR FLUID CONTAINER

Matter enclosed in heavy brackets [ ] appears in the original patent but forms no part of this reissue specification; matter printed in italics indicates the additions made by reissue.

CROSS-REFERENCE TO RELATED APPLICATIONS

This Application is a Continuation-in-Part of pending U.S. patent application entitled Cap for Fluid Container with Threaded Neck by Brian M. Adams and Daniel Luch Ser. No. 08/436,936, filed May 8, 1995, *now U.S. Pat. No. 5,662,231* which is a continuation-in-part of Ser. No. 08/016,577 filed Feb. 10, 1993, now abandoned, which is a Continuation-in-Part of Ser. No. 07/772,949, filed Oct. 8, 1991, now U.S. Pat. No. 5,232,125.

BACKGROUND OF THE INVENTION

1. Field of the Invention

This invention relates to a new and improved cap for a fluid container which is formed with a conical well which splits when pierced by a dispenser probe and substantially recloses when disengaged from the probe. More particularly, the invention relates to a snap-on cap for a bottle neck having a crown finish either with or without a superimposed threaded finish which is tamper-evident and includes spill reduction features.

2. Description of the Related Art

Plastic push-on bottle caps for use with container necks having a crown finish with a superimposed threaded finish are shown in U.S. Pat. Nos. 3,392,860 and 3,979,002 as well as elsewhere in the art. The present invention provides a cap which engages both the crown finish of the neck and the threaded finish. Further, means is provided whereby the cap cannot be removed from the neck without tearing off a portion of the cap and hence the cap is tamper-evident.

Push-on caps have been in public use by the assignee of this Application. However, the use of barriers to prevent unscrewing the cap has not previously been known in the art.

Caps having wells pierced by dispenser probes are likewise known.

The use of foam disks on the undersides of the tops of plastic caps to seal against the lip of a neck are also known in the art.

SUMMARY OF THE INVENTION

Two basic forms of cap are disclosed. One is used to close the neck of a bottle of the type having a crown positioned below the lip with a restricted diameter portion above the crown and a screw thread around the restricted diameter portion. Bottles of this type have been used commercially. The lower portion of such bottle is usually rectangular in cross-section so that a plurality of bottles may be stacked on top of each other without the necessity of using pallets. Such bottles have heretofore been closed by a metal screw cap having threads engaging the threads on the bottle. To make the system tamper-evident, a plastic snap-on overcap has been used. However, stacking of bottles causes increased hydraulic pressure to be exerted on the bottom bottles, and this is aggravated by hydraulic "hammer" resulting from transportation by truck. This has resulted in leakage.

The use of a metal screw cap has been found somewhat undesirable because of its tendency to rust.

Another development in use in water bottles is a type cap which remains on the bottle and is provided with sealing means to prevent leakage from the bottle when it is installed in a water dispenser and also when it has been removed. The aforesaid metal caps and plastic overcaps have not been found adaptable to this new development.

The use of caps, such as shown in U.S. Pat. Nos. 3,392,860 and 3,979,002, in stacked bottle installations has been found to be unsatisfactory, because during transport the "hydraulic hammer" forces the cap upward on the neck. If a foam liner is used under the top of the cap, such liner tends to separate from the neck as the cap is forced upward.

In this form of the present invention, a plastic push-on type cap is used having a top under which is installed an annular foam plastic gasket. The skin of the cap has a restricted diameter upper portion which is internally threaded. Vertical "barriers" are formed below the internal thread, preventing the cap from being removed from the neck threads so long as the cap in intact. Below the restricted upper portion, the skirt expands outwardly and has an internal locking bead which snaps over and engages the underside of the crown finish of the neck. The lower skirt portion extends downwardly and frictionally engages the exterior of the neck. The barriers engage the ends of the threads of the neck and such ends are tapered both in width and in thread height to function as wedges or ramps. The barriers are bowed outward if an attempt is made to unscrew the cap while the lower skirt portion is intact and thereby the cap threads unseat from the neck threads. Hence repeated turning of the cap does not unscrew the cap from the neck.

Vertical tear lines extend up from the bottom edge of the cap to the region of the internal threads and a tear tab is provided which, when pulled, tears the cap along the scorelines. Once the cap is torn, evidence of tampering appears. Further when the cap is torn the lower skirt does not inhibit upward movement of the cap and hence the cap may be unscrewed or merely lifted off the neck.

In installing the cap, the tear tab provides an orientation means which aligns the cap threads with respect to the neck threads so that when the cap is forced axially downwardly over the neck, the cap threads expand outwardly to clear the neck threads and then contract to mate with the neck threads, thereby insuring that the cap does not have to be screwed onto the neck. Simultaneously, the lower portion of the skin seats on the crown of the cap and the locking bead seats under the crown bead of the neck. The barriers are located adjacent the neck thread ends so that unscrewing the cap causes the barriers to ramp up over the thread ends.

The second basic form cap is a modification of U.S. Pat. No. 5,370,270, to which reference is made.

An important feature of both caps is the elimination of spillage when the bottle is installed in a conventional water dispenser and a considerable reduction in spillage of any water which may remain in the bottle when the bottle is removed from the dispenser. Accordingly, a conical well is formed in the center of the top of the cap, the well having a rounded bottom. A scoreline is formed, preferably on the interior of the cap, consisting essentially of three continuous sections, namely, a first section extending down from the top, a second section extending across the rounded bottom of the well and a third section extending from the second section up to the top of the cap, all three sections lying in a common diametric plane.

A common form of water dispenser has a hollow, apertured probe extending vertically upward so that as the bottle, with cap attached, is lowered into the dispenser, the probe engages the well and causes the well to split along the scoreline, permitting water to flow from the bottle into the probe and then to the dispenser. A short rib is formed extending perpendicular to the scoreline. The tip of the probe first contacts the rib and initiates tearing the well apart at the scoreline. When the user wishes to remove the bottle, withdrawal of the probe from the well allows the well to close at least partially, to reduce the amount of water which may flow out of the bottle while it is being removed from the dispenser and restored to upright position.

BRIEF DESCRIPTION OF THE DRAWINGS

The accompanying drawings which are incorporated in the form as part of this specification illustrate embodiments of the invention and, together with a description, serve to explain the principals of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
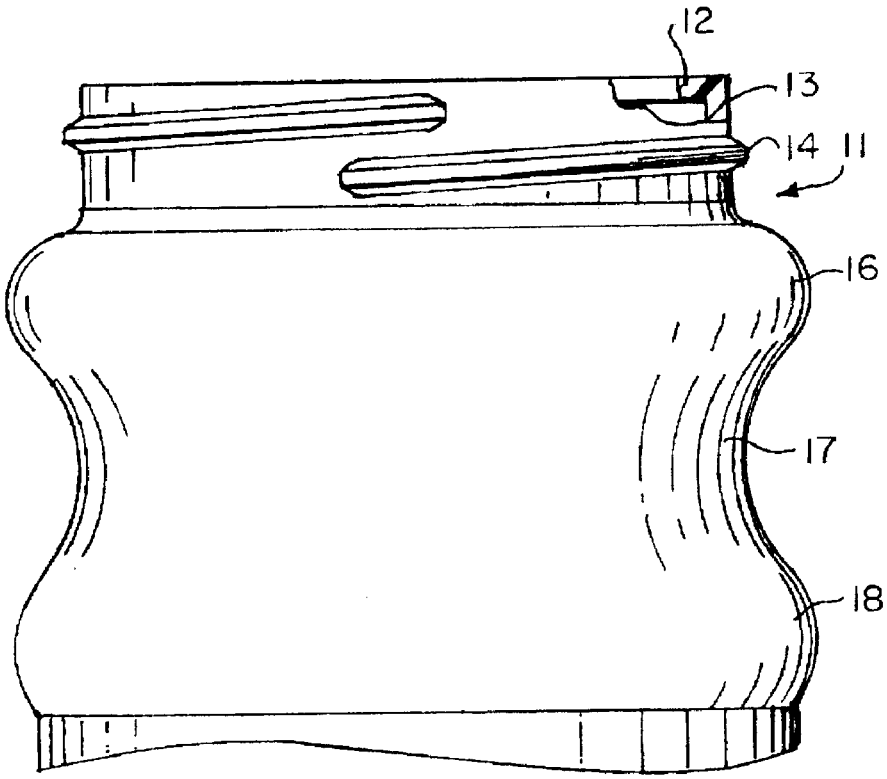
FIG. 1 is a side elevational view of the neck of a bottle with which one of the caps of the present invention may be used, being partially broken away in section.
Figure 2:
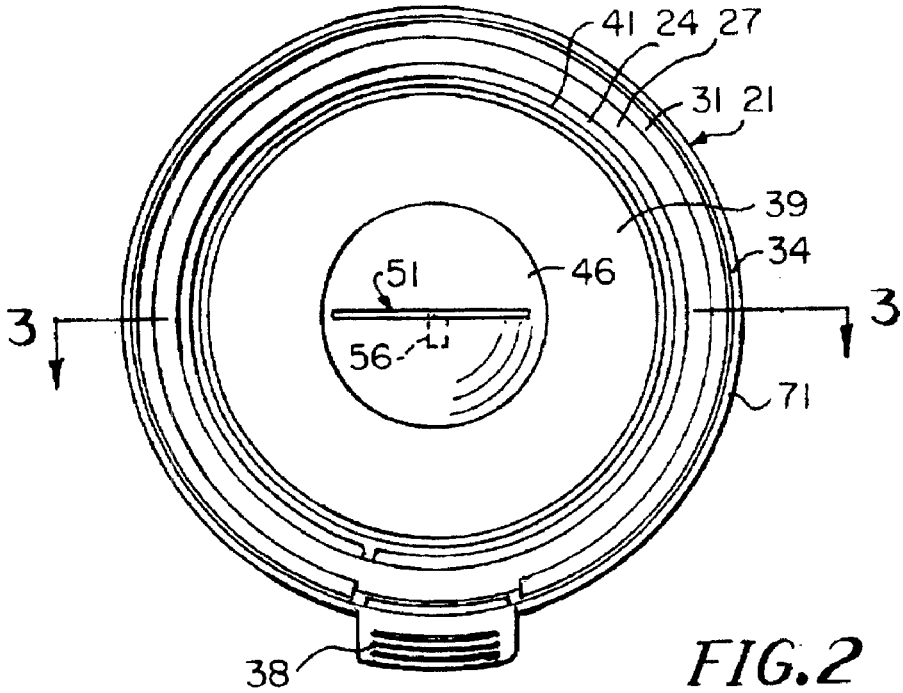
FIG. 2 is a bottom plan view of a cap used with the neck of FIG. 1.
Figure 3:
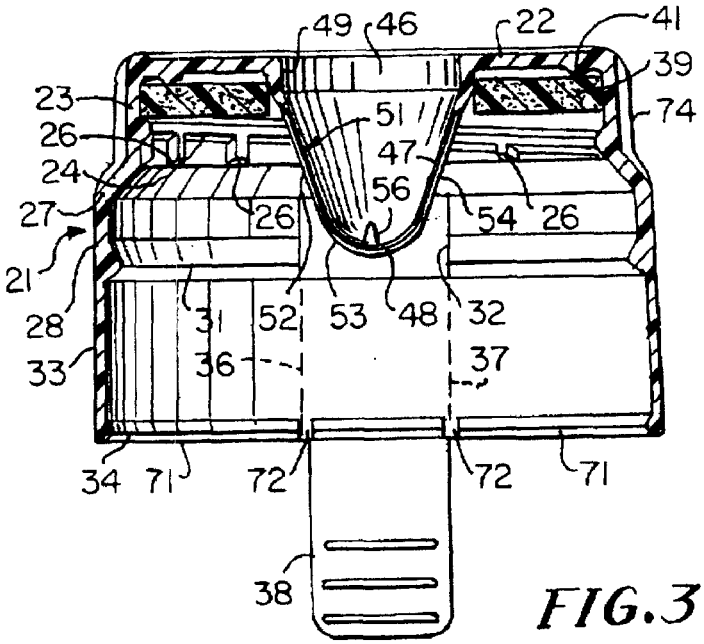
FIG. 3 is a vertical sectional view taken substantially along the line 3—3 of FIG. 2.

One form of cap of the present invention is used on a water bottle, the body of which (not shown) is generally rectangular in cross-section so that a number of bottles which are horizontally disposed may be stacked on top of each other. The neck 11 of such a bottle has a lip 12 from which depends a restricted diameter cylindrical vertical stretch 13. One turn of external screw thread 14 is applied to the stretch 13 and is generally slightly greater than 360° in extent. As shown in FIG. 1, the ends 15 of thread 14 taper both in width and in thickness to function as wedges or ramps, as hereinafter appears. Below vertical stretch 13 is an enlarged external bead or crown 16 and below the crown 16 is a concave portion 17 and below portion 17 is a generally rounded portion 18.

In the form of the invention shown in FIGS. 2–5, cap 21 has a top 22 which is circular and a vertical skirt stretch 23 depends from the periphery of top 22. A slightly less than 360° internal screw thread 24 is formed on the interior of the vertical stretch 23. Vertical barriers 26 are formed on the interior surface of stretch 23 extending downwardly from thread 24. Barriers 26 are angularly spaced apart along thread 24 and also extend to the level of the lower end of thread 24. As described below, the presence of barriers 26 prevents the cap from being removed, so long as the cap is intact.

Below vertical stretch 23 cap 21 expands downwardly and outwardly in a slanted stretch 27 and below the stretch 27 is a second vertical stretch 28. On the interior of stretch 28 is an internal locking bead 31 which engages under crown 16 of neck 11. Below locking bead 31 the skirt 33 extends downwardly to engage the surface 18 of neck 11 below concave portions 17.

Extending below bottom edge 34 of skirt 33 is tear tab 38. To one side of tear tab 38 extending upward from bottom edge 34 is external scoreline 36 which extends up the outside of cap 21 to the level of top 22. On the opposite side of tear tab 38 is second scoreline 37 which extends up from bottom edge 34 to the level of the bottom edge of slanted stretch 27. A break 32 in locking bead 31 extends between the scorelines 37 and 38.

Figure 4:
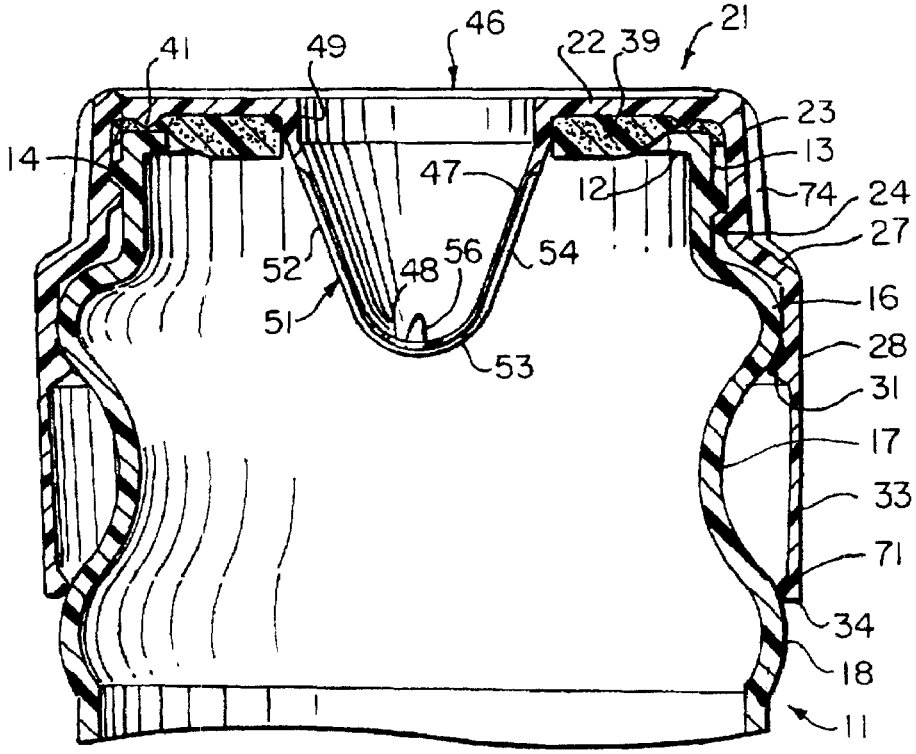
FIG. 4 is a vertical sectional view showing the cap of FIG. 2 installed on the neck of FIG. 1.

Additional features of the cap 21 include an internal bead 71 at bottom edge 34 which, as shown in FIG. 4, engages neck 11 to prevent dirt from entering under the skirt 33. Breaks 72 in bead 71 occur corresponding to external scorelines 36 and 37.

To rigidify the upper end of the cap, external ribs 74 lying in vertical radial planes extend from top 22 to the bottom edge of slanted stretch 27.

A foam disk 39 which is annular in shape is installed on the underside of top 22. To improve engagement of disk 39, a circular internal bead 41 is formed on the underside of top 22 adjacent vertical stretch 23.

At the time of installation of cap 21 on neck 11, tear tab 38 is oriented with respect to the threads 14 and threads 14 are easily oriented by reason of the rectangular cross-section of the body of the bottle. When the cap 21 is pushed axially downwardly without rotation onto neck 11, bead 31 slips over the crown 16. Thread 24 expands and slips over thread 14. By reason of the orientation of the cap 21 relative to the neck 11, the threads 24 and 14 interengage tightly and there is no need to screw the cap onto the neck. Foam disk 39 seals on the lip 12 and against bead 41. Despite water hammer during transportation, the foam disk 39, the seating of the threads 14 and 24 and the seating of the bead 31 and crown 16 make the cap water-tight. Furthermore, it is also tamper-evident since the barriers 26 prevent the cap from being unscrewed so long as the cap is intact.

If one attempts to unscrew the cap, barriers 26 ride up on ramp 15. The cap stretches outward so that threads 14 and 24 disengage and repeated turning of the cap does not cause it to move upward relative to neck 11.

To remove the cap, one grips the tear tab 38 and pulls upwardly so that the cap tears along the tear lines 36 and 37. With the lower portion of the cap loosened it is possible for the consumer to then remove the upper portion of the cap, providing access to the contents of the container.

Top 22 is formed with a central conical well 46 having a very short cylindrical stretch at the top merging into conical side wall 47 which, in turn, merges into a rounded bottom 48. The level of bottom 48 is approximately that of the locking bead 31. Well 46 is formed with an internal scoreline 51 consisting of a first stretch 52 extending from adjacent the top of conical side 47 downwardly and merging with a second stretch 53 which extends across the bottom 48 and then merging with an upward stretch 54. The stretches 52, 53 and 54 lie in common diametric plane. On the exterior of the bottom 53 is a rib 56 perpendicular to the plane of scoreline 51.

Figure 5:
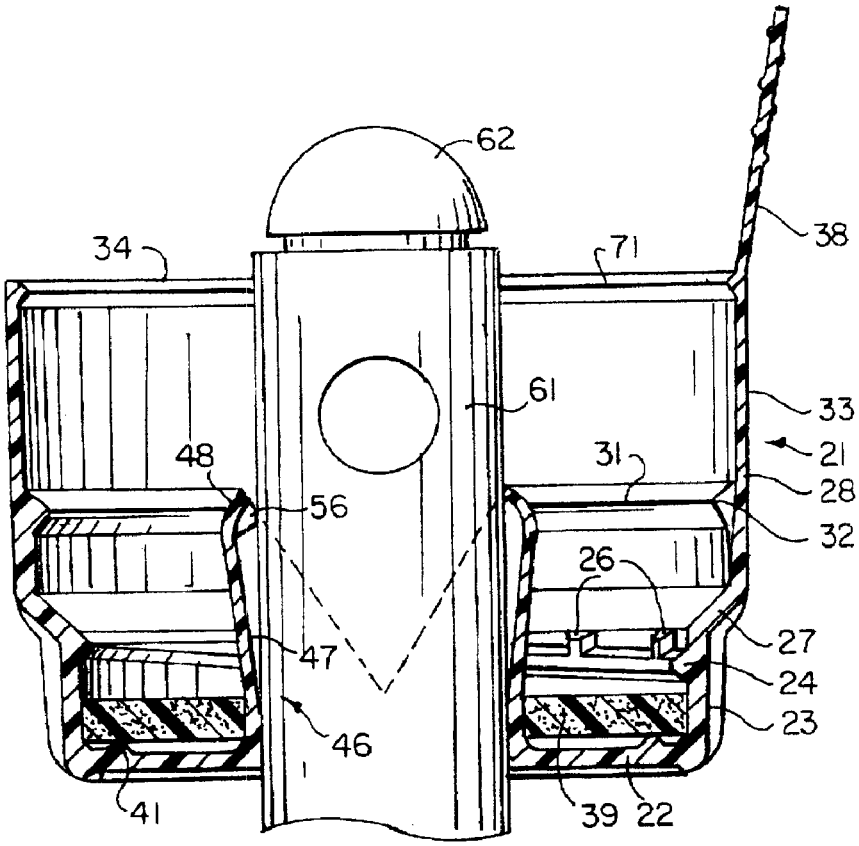
FIG. 5 is a schematic vertical sectional view showing a water dispenser probe extending through the well of a cap.

The container with cap 21 in place on neck 11 is inverted and installed in the dispenser by vertical downward movement. The dispenser has a hollow, apertured probe 61 extending vertically upwardly. As the bottle lowers, the tip 62 of probe 61 encounters rib 56 and then bottom 48 causing the well 46 to split along internal scoreline 51 until the position of FIG. 5 is obtained. Water enters probe 61 and flows into the dispenser as required.

After the contents of the bottle have been substantially depleted, the bottle is removed by lifting vertically upwardly. The two halves of the well 46 shown in FIG. 5 come together by reason of the resiliency of the plastic material of which the cap is molded. The well 46 is not restored to its original condition but substantial leakage is inhibited so that spillage of water onto the outside of the dispenser and/or floor is avoided. When the container is returned to the bottling works, an attendant grips tear tab 38, causing the cap to tear along scorelines 36 and 37 so that cap 21 may be removed.

Figure 6:
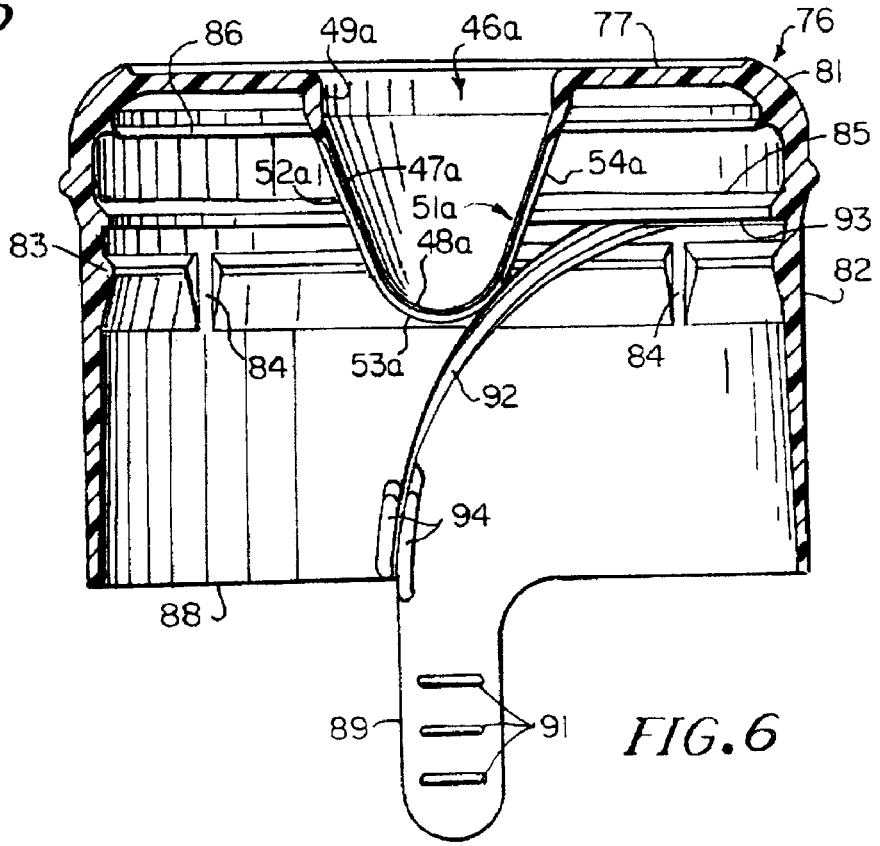
FIG. 6 is a view similar to FIG. 3 of a modified cap.

Directing attention to FIG. 6, the well of the present invention may be installed in a different cap structure such as that shown in U.S. Pat. No. 5,370,270. Cap 76 fits on a container neck (not shown). Cap 76 has an annular top 77 and well 46a is positioned centrally thereof. The structure of well 46a resembles that of the preceding modification and the same reference numerals followed by the subscripts a are used to designate corresponding elements.

Cap 76 has a rounded corner 81 disposed outwardly of top 77 and below corner 81 is a depending skirt 82. A tension ring 85 is located on the inside of the skirt 82 in a position to fit under the neck bead or crown (not shown) and to draw corner 81 toward the neck bead. Preferably, there is an internal seal bead 86 on the inside of the wall of the corner 81 which tightly engages the container lip and seals against leakage. Standoffs 84 are radially spaced apart and inward projecting to hold the wall of the skirt 82 outwardly of the concavity of the container neck and also facilitate pushing the cap 76 onto the neck.

In order to loosen the lower portion of skirt 82 so that cap 76 may be removed from the neck, a tab 89 extends downward from the bottom edge 88 of the skirt 82 and is formed with transverse finger grip ridges 91 to facilitate pulling the tab. Curving upwardly from bottom edge 88 adjacent tab 89 is a scoreline 92 which merges with a horizontal scoreline 93 immediately below tension ring 85. By pulling upward on the tab 89, the skirt tears along the scoreline 92 and then along a sufficient portion of scoreline 93 so that the lower portion of the skirt 82 releases its grip on the neck. So long as the skirt 82 is intact on the neck, it is practically impossible to remove the cap 76 and hence the cap is tamper-evident. Once the lower portion of the skirt is loosened, the upper portion of the cap may be removed and used as a reclosure cap.

It will be understood that in the preferred practice of the present invention, cap 76 is not removed prior to installation on the container in the dispenser. However, many times the consumer may wish to use the container in a different type of dispenser. Further, after the container has been returned to the bottling works, it is necessary to remove the cap 76 before the bottle is sterilized and refilled. Hence the tab 89, scorelines 92 and 93 are used for such purposes. A buttress or internal thickening 94 is formed adjacent the intersection of bottom edge 88 and the bottom of scoreline 92 to prevent unintentional tearing of the skirt along any lines other than the lines 92 and 93. The buttress 94 assists in confining the tear to the proper line.

When used in a dispenser of the type hereinabove described and wherein there is a probe, the cap of FIG. 6, in place on the container neck, is inverted. Penetration of the tip 62 causes the well 46a to fracture along internal scoreline 51a as in the preceding modification. When the bottle is withdrawn from the dispenser, the halves of the well 46a come together to inhibit leakage of water, as in the preceding modification.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A cap for use with a container neck having external means for detachably engaging said cap, said cap being shaped to fit over said neck and comprising a top and a [shirt] *skirt* depending from said top to fit outside said neck, internal means on said skirt to engage said external means to hold said cap on said neck, said top being formed with a central well having a side wall and a bottom, [a] *at least one* scoreline [extending along said side wall and across] *positioned on* said bottom, [whereby] *said side wall formed to cause* a probe *having a blunt tip to engage said bottom at a center thereof as the probe is* forced into said well, *said at least one scoreline positioned such that the blunt tip* splits said [well] *bottom* along said *at least one* scoreline *as the blunt tip of the probe is forced against said center of said bottom* so that said probe may enter said neck.

2. A cap according to claim 1 made of resilient material whereby said well is restored substantially to initial condition when said probe is withdrawn from said well to inhibit spillage from said container neck.

3. A cap according to claim 2 which further comprises a gasket on the underside of said top to seal said cap to said [lip] *neck*.

4. A cap according to claim [4] *3* in which said gasket is of foam plastic.

5. A cap according to claim 1 in which said cap is of a resilient plastic and said external means comprises a first screw *thread and said internal means comprises a second screw thread* whereby said second screw thread expands to slip over said first screw thread when said cap is pushed axially downward on said neck without relative rotation of said cap and said neck.

6. A cap according to claim 5 for use with a container having first orientation means, said cap further comprising second orientation means [cooperable with said first orientation means] whereby when said cap is pushed axially downward on said neck said first screw thread and said second screw thread are inter-engaged.

7. In combination a container neck and a cap according to claim 1 in which said external means comprises a crown bead and said internal means comprises a locking bead positioned to engage under said crown bead to prevent removal of said cap from said neck when said cap is intact.

8. The combination of claim 7 which further comprises means for removing a portion of said [skirt containing said] locking bead to [prevent] *allow* removal of said cap from said neck.

9. A cap according to claim 1 in which said external means comprises a first screw thread and said internal means comprises a second screw thread.

10. A cap according to claim 9 wherein said neck has a lip, a cylindrical portion below said lip formed with said external first screw thread and a crown bead below said cylindrical portion, said first screw thread having [an] *a thread* end [formed as a ramp of reduced thickness], said cap comprising a top and a skirt depending from said top, said skirt having a restricted diameter cylindrical upper stretch formed with said internal second screw thread shaped and positioned to mate with said first screw thread, an enlarged diameter stretch below said upper stretch for engaging said crown bead and an internal locking bead for engaging the underside of said crown bead, and at least one barrier extending downward from said second screw thread, said at least one barrier being horizontally aligned with said [ramp] *thread end* when said cap is installed on said neck, whereby turning said cap relative to said neck in an unwinding direction causes said cap skirt to expand outward and said second screw thread to disengage from said first screw thread.

11. A cap according to claim 10 which further comprises a plurality of downward extending second barriers angularly spaced apart [and] from said first-mentioned barrier and depending from said screw thread.

12. A cap according to claim [1] *10* in which said skirt extends below said enlarged diameter stretch to a bottom edge, a tear tab extending below said bottom edge and a tear line formed in said skirt adjacent said tear tab extending up from said bottom edge to said upper stretch.

13. A cap according to claim 12 in which said tear line is substantially vertically disposed and which further comprises a second tear line approximately parallel to said first-mentioned tear line disposed on the side of said tear tab opposite said first mentioned tear line extending up from said bottom edge to said upper stretch.

14. A cap according to claim 12 which further comprises a plurality of angularly spaced apart guide ribs extending downward from said internal locking bead[, said guide ribs being triangular in vertical cross-section].

15. A cap according to claim 1 in which said side wall is conical.

16. A cap according to claim 15 in which said bottom is round.

17. A cap according to claim 16 in which said scoreline comprises a first stretch along said side wall, a second stretch across said bottom and a third stretch along said side wall, said stretches being joined end to end and lying in a common plane [substantially diametric relative to] *containing the axis of* said well.

18. A cap according to claim [17] *1* which further comprises a short [external] rib on said bottom extending away from said scoreline whereby said probe when forced into said well first contacts said rib to initiate splitting said [well] *bottom along said scoreline*.

19. In combination, a container neck and a cap according to claim 1, said container neck having a lip, a cylindrical portion below said lip formed with said external first screw thread and a crown bead below said cylindrical portion, said first screw thread having an end formed as a ramp, said cap having at least one barrier extending substantially vertically downward relative to one of said screw threads into horizontal alignment with said ramp, said skirt being flexible, whereby turning said cap relative to said neck in an unwinding direction so long as said cap is intact causes said cap to expand outward and said screw threads to disengage from each other, and means to tear a portion of said skirt to release said cap from said neck.

20. The combination of claim 19 in which said at least one barrier is on said cap and extends downwardly from approximately 0° of angle of said second screw thread to approximately the elevation of 360° of angle of said second screw thread.

21. The combination according to claim 19 in which said cap is of resilient material whereby said well is restored substantially to initial condition when said probe is withdrawn from said well.

22. The combination of claim 19 in which said side [wail] *wall* is conical.

23. The combination of claim 22 in which said bottom is round.

24. The combination of claim 23 in which said scoreline comprises a first stretch along said wall, a second stretch across said bottom and a third stretch along said side wall, said stretches forming a substantially continuous line in a plane [substantially diametric relative to] *containing the axis of* said well.

25. The combination according to claim 24 which further comprises a short [external] rib on said bottom extending away from said second stretch.

*26. In combination, a hollow, apertured probe having a blunt tip, a cap, a container having a neck having external means for detachably engaging said cap,*

*said cap being shaped to fit over said neck and comprising a top and a skirt depending from said top internal means on said skirt to engage said external means to hold said cap on said neck, said top being formed with a central wall having a side wall and a bottom, at least one scoreline positioned on said bottom,*

*said blunt tip engagable with said bottom to split said scoreline so said probe may enter said container.*

*27. The combination of claim 26 in which said probe seals against said well.*

*28. The combination of claim 27 wherein said probe seals against said sidewall.*

* * * * *

UNITED STATES PATENT AND TRADEMARK OFFICE

CERTIFICATE OF CORRECTION

PATENT NO. : RE 39,340 E
APPLICATION NO. : 09/375164
DATED : October 17, 2006
INVENTOR(S) : Brian M. Adams, Hoa Pham and Daniel Luch It is certified that error appears in the above-identified patent and that said Letters Patent is hereby corrected as shown below:

IN THE CLAIMS

At column 6, line 41 (claim 3, line 1), change “claim 2” to --claim 1--.

At column 8, line 48 (claim 26, line 8), change “central wall” to --central well--.

Signed and Sealed this

Second Day of October, 2007

JON W. DUDAS
*Director of the United States Patent and Trademark Office*